R. GOODE.
FLOOR SCRUBBING MACHINE.
APPLICATION FILED MAR. 21, 1914.
1,126,981.
Patented Feb. 2, 1915.
4 SHEETS—SHEET 1.
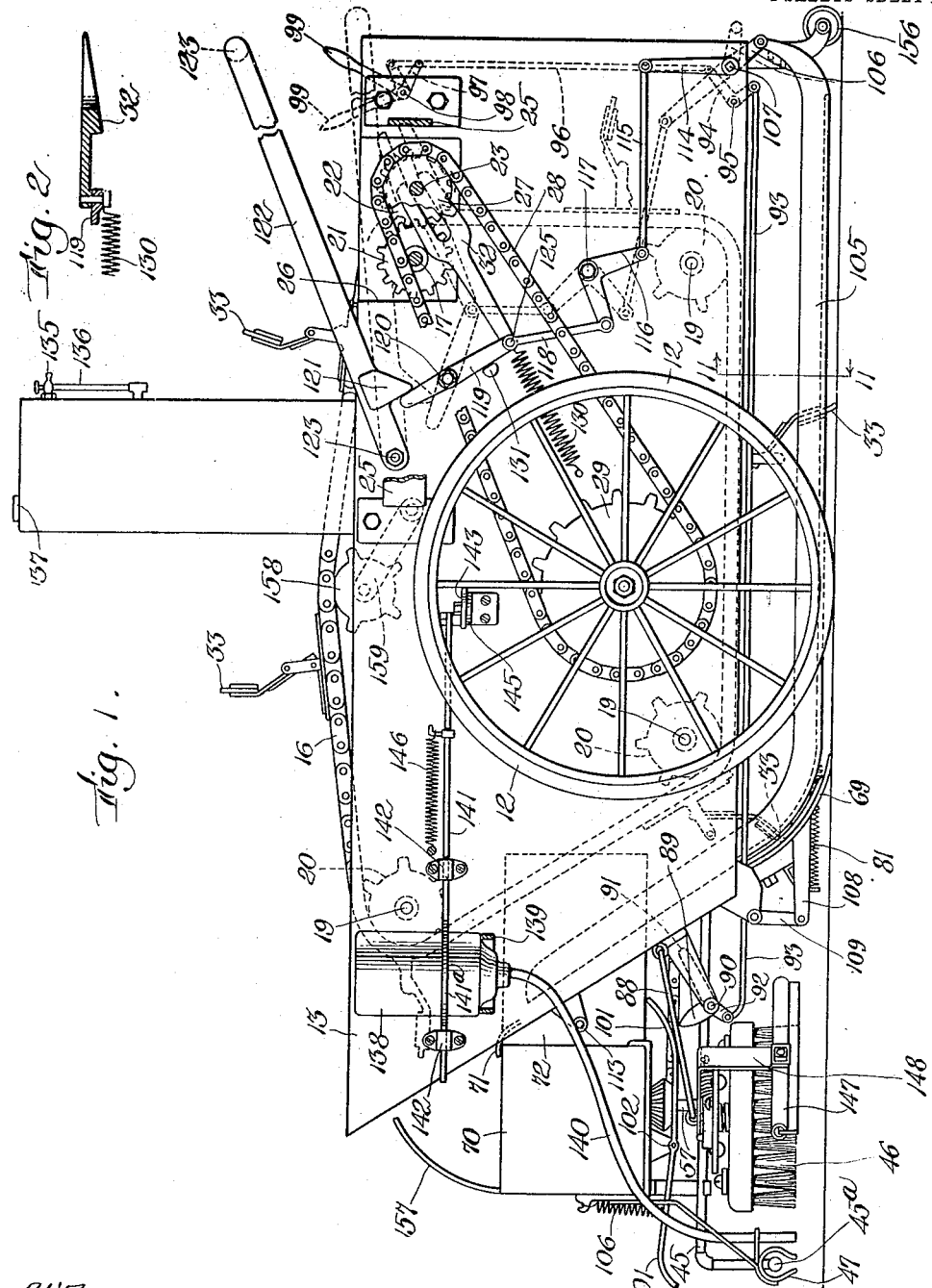
Witnesses:
Inventor:
Robert Goode,
by Wright Brown Quimby May
Attorneys.

R. GOODE.
FLOOR SCRUBBING MACHINE.
APPLICATION FILED MAR. 21, 1914.
1,126,981.
Patented Feb. 2, 1915.
4 SHEETS—SHEET 2.
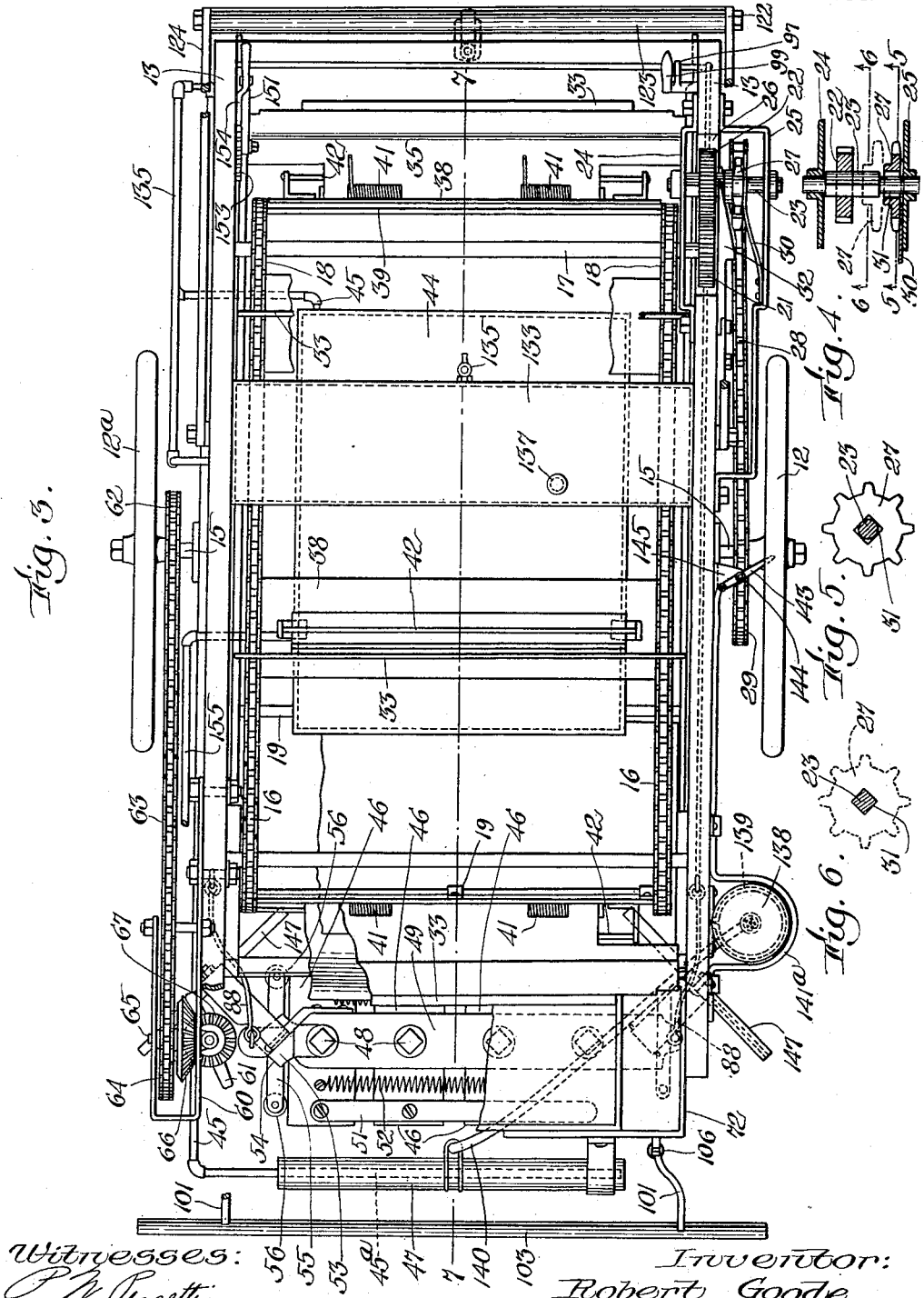
Witnesses:
P. W. Pizzetti
E. T. Batchelder
Inventor:
Robert Goode,
by Wright Brown Quinby May
Attorneys.

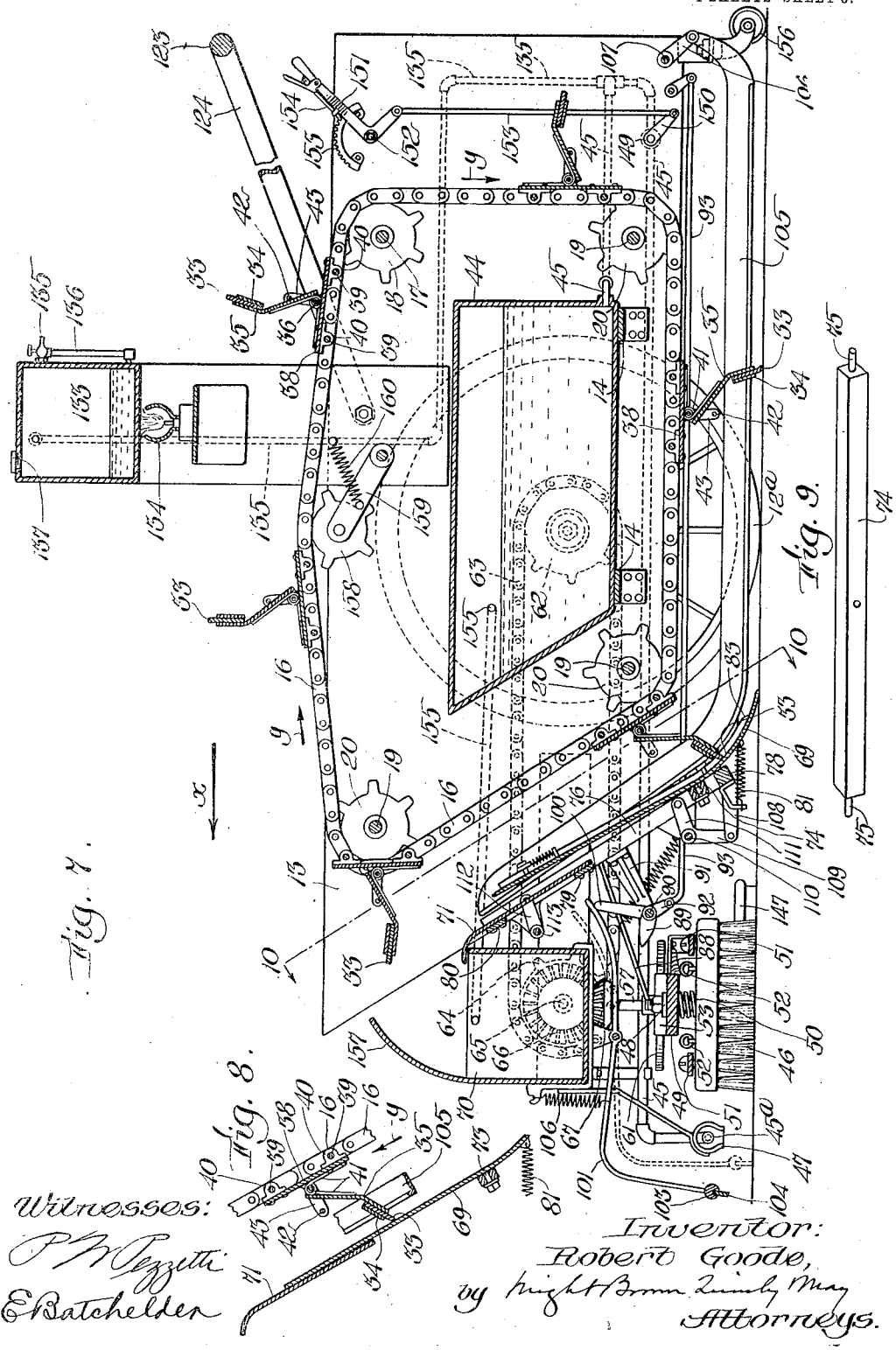

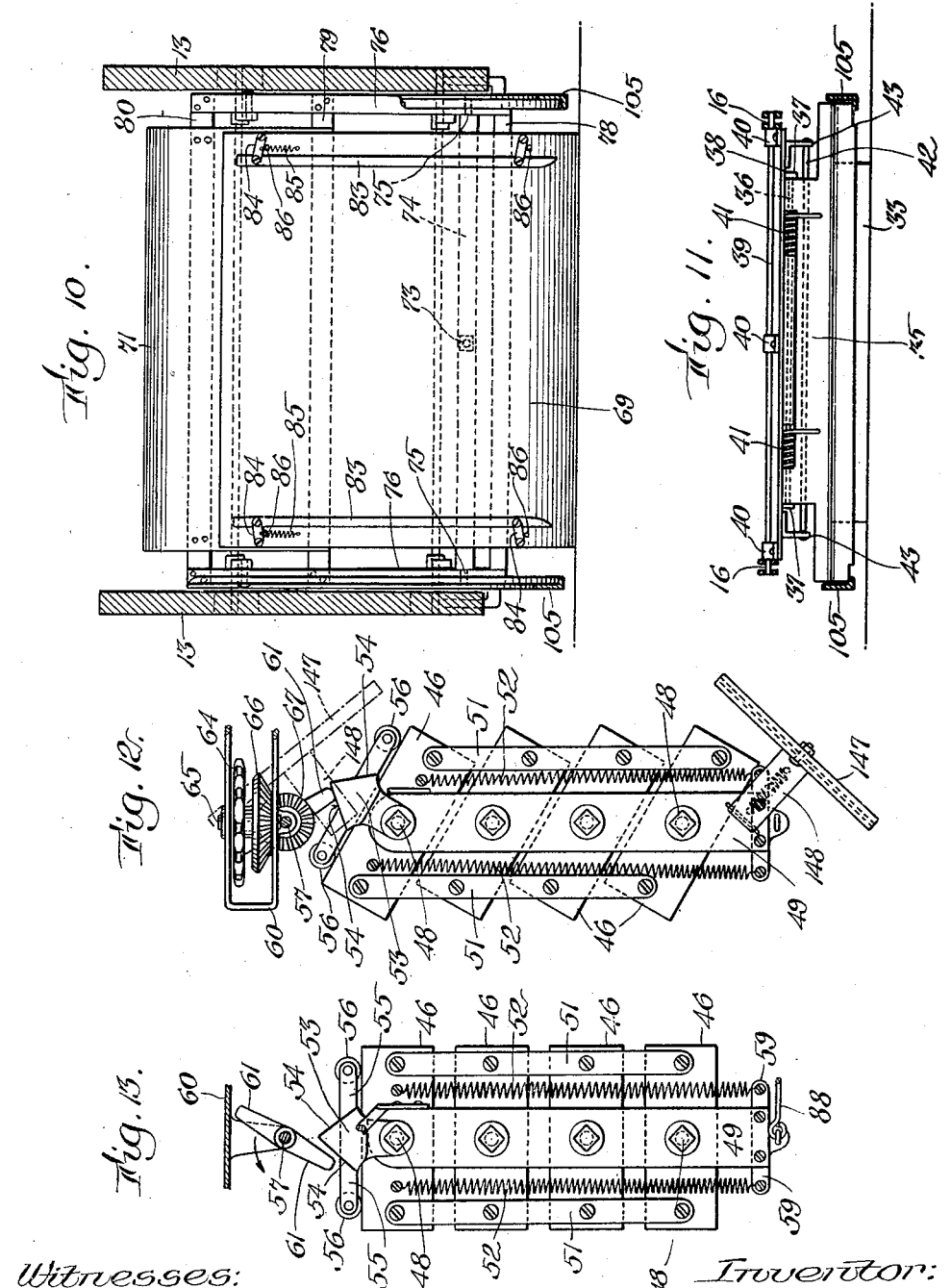

UNITED STATES PATENT OFFICE.

ROBERT GOODE, OF BOSTON, MASSACHUSETTS.

FLOOR-SCRUBBING MACHINE.

1,126,981.  Specification of Letters Patent.  Patented Feb. 2, 1915.

Application filed March 21, 1914. Serial No. 826,229.

*To all whom it may concern:*

Be it known that I, ROBERT GOODE, a citizen of the United States, and resident of Boston, Dorchester district, in the county of Suffolk and State of Massachusetts, have invented certain new and useful Improvements in Floor-Scrubbing Machines, of which the following is a specification.

This invention has for its object to provide a scrubbing machine adapted to thoroughly clean a floor without leaving free water thereon, and it consists in the improvements which I will now proceed to describe and claim.

Of the accompanying drawings forming a part of this specification: Figure 1 represents a side elevation of a machine embodying my invention; Fig. 2 represents a longitudinal section of the sprocket wheel shipper hereinafter referred to; Fig. 3 represents a top plan view; Fig. 4 represents a fragmentary view illustrating the shiftable sprocket wheel hereinafter described and the shaft on which it is mounted; Fig. 5 represents a section on line 5—5 of Fig. 4; Fig. 6 represents a section on line 6—6 of Fig. 4; Fig. 7 represents a section on line 7—7 of Fig. 3; Fig. 8 represents a fragmentary section similar to a portion of Fig. 7, certain parts being shown in different positions from those shown by Fig. 7; Fig. 9 represents a perspective view of the rocking cross-bar hereinafter described; Fig. 10 represents a section on line 10—10 of Fig.7; Fig. 11 represents a section on line 11—11 of Fig. 1; Figs. 12 and 13 represent plan views of the gang of brushes hereinafter described and parts of the mechanism for oscillating said brushes.

The same reference characters indicate the same or similar parts in all the views.

The supporting frame of the machine is supported by rubber tired traction wheels 12 and 12ª, and includes longitudinal side members 13 and suitable transverse members 14 (Fig. 7) rigidly connecting the side members. The traction wheels are mounted on stub axles 15 (Fig. 3) attached to the frame members 13.

Journaled in bearings in the frame members 13 are a series of transverse shafts carrying sprocket wheels which engage and support two endless wiper - carrying sprocket chains 16. One of said shafts 17 is power driven, said shaft being connected with and driven by the wheel 12 as hereinafter described, and provided with sprocket wheels 18 which drive the chains 16. The other transverse shafts 19 rotate loosely and carry idle sprocket wheels 20, which are arranged as shown by Figs. 1 and 7 to support the chains 16 in upper and lower longitudinal stretches and in intermediate forward and rear end stretches, the lower stretches being parallel with the floor on which the machine acts, and the forward stretches being inclined relatively to the floor as shown by Fig. 7.

The driven shaft 17 has a gear 21 (Figs. 1 and 3) meshing with a gear 22 which is mounted on a short shaft 23 journaled in bearings formed in frame bars 24, 25 attached to and offset from one of the longitudinal frame members 13, said frame member having a recess 26 (Figs. 1 and 3) across which the bars 24 and 25 extend, said recess receiving the gears 21, 22. The shaft 23 has a squared inner portion and a cylindrical outer portion, as shown by Fig. 4, and on it is mounted a laterally movable or shiftable sprocket wheel 27 which is connected with a rotary driving member on the traction wheel 12, said member being a sprocket wheel 29 connected with the shiftable sprocket wheel 27 by a sprocket chain 28.

The shiftable sprocket wheel 27 has a squared socket 31 and is normally held by a spring 30 (Fig. 3) with its socket in engagement with the squared portion of the shaft 23 as shown by dotted lines in Fig. 4, so that the rotation of said wheel drives the wiper-carrying chains 16. The sprocket wheel 27 is shiftable by a wedge-shaped shipper 32, operated as hereinafter described, onto the cylindrical portion of the shaft 23, as shown by full lines in Fig. 4, to stop the rotation of the shaft 23 and the operation of the wiper-carrying chains 16. Said chains carry a series of wipers 33, each of which is a flexible rubber blade clamped by a metal strip 34 against an arm 35 (Fig. 11). Said arm is mounted to oscillate on a pintle rod 36 attached to ears 37 on a carrying plate or bed 38, which is secured to the chains 16 by transverse rod 39 secured at its ends to said chains as shown by Figs. 7 and 11, and passing through socketed blocks or lugs 40 affixed to the carrying plate 38.

The arm 35 is held yieldingly by springs 41 (Fig. 11) against a stop rod 42 supported by ears 43 attached to the carrying plate 38, the arrangement being such that a wiper 33 in contact with the floor yields backwardly from the stop rod 42, as shown at the lower portion of Fig. 7, said wiper being therefore pressed yieldingly against the floor. When the wiper passes away from the floor and from the inclined pan hereinafter described, the springs 41 force the arm 35 against the stop rod 42, as shown by the upper and right-hand portion of Fig. 7.

44 represents a water tank supported by the transverse frame members 14 between the longitudinal frame members 13. A pipe line 45 extends from said tank to the front portion of the machine where it terminates in a transverse horizontal perforated distributer $45^a$ adapted to discharge water from the tank upon the floor in front of a series or gang of brushes 46 which are oscillated by power communicated as hereinafter described from the traction wheel $12^a$. The distributer $45^a$ is covered by a hood 47. As shown by Figs. 7, 12 and 13, the brushes 46 are connected by pivot bolts 48 to a transverse bar 49, said bolts being movable vertically in said bar, and the brushes being pressed downwardly by springs 50 interposed between their backs and the bar 49 as far as the heads of the bolts, bearing on said bar, will permit, provision being thus made for pressing the brush bristles yieldingly against the floor. The brushes, four of which are shown, are connected by parallel bars 51 and are adapted to oscillate between the positions shown by Figs. 12 and 13. They are normally held in the position shown by Fig. 13 by springs 52 connecting the brush at one end of the series with ears 59 attached to the bar 49. Pivoted to the bolt 48 at one end of the series is a head 53 having two oppositely inclined faces 54 and two oppositely projecting arms 55 having rolls 56 which bear on the edge of the brush head at one end of the series. A vertical shaft 57, journaled in bearings on a frame bar 60 (Figs. 3, 12 and 13) attached to one of the longitudinal frame members 13 and provided with oppositely projecting tappet arms 61, is rotated from the traction wheel $12^a$ by a sprocket wheel 62 attached to the hub of said traction wheel, a sprocket chain 63 connecting the wheel 62 with a sprocket wheel 64 on a short shaft 65 journaled in the frame bar 60, and a bevel gear 66 meshing with a bevel gear 67 on the tappet shaft 57. The rotation of the shaft 57 in the direction of the arrow in Fig. 13 causes its arms 61 to coöperate alternately with one of the faces 54 in positively moving the brushes from Fig. 13 to Fig. 12 position, the springs 52 returning the brushes yieldingly to Fig. 13 position after each tappet arm passes said face 54. The other face 54 coöperates with the tappet arms in the same way when the shaft 57 is rotated in the opposite direction. The described movements of the brushes cause them to exert a scrubbing action on the floor.

The water left on the floor behind the advancing brushes is carried by the wipers 33 on the lower stretches of the chains 16 to an inclined sheet metal pan 69 and upwardly along said pan to a guide 71 between said pan and a collecting tank 70, which is attached by ears 72 to the forward portions of the frame members 13. The pan 69 has a curved lower edge adapted to slide on the floor and is connected by a pivot bolt 73 with a rocking cross bar 74 (Fig. 9) the ends of which have trunnions 75 journaled in bearings in inclined frame bars 76 (Figs. 7 and 10) suitably connected with the frame members 13. The pan 69 is therefore adapted to swing on a horizontal axis formed by the bar 74, so that its lower edge is movable toward and from the floor, the connection of the pan with said bar by the pivot bolt 73 permitting the edge of the pan to conform to slight inclinations of the floor. The inclined bars 76 are preferably the side members of a rectangular frame which is movable independently of the frame members 13 to raise and lower the pan 69, the said inclined bars being connected by horizontal bars 78, 79 and 80, which complete said movable frame. The guide 71 is attached to the frame bars 79 and 80 as shown by Figs. 7 and 10. A spring 81 (Fig. 7), attached to an ear on the lower bar 78 and to the pan 69, holds the lower portion of the pan yieldingly against the bar 78, and the upper portion of the pan yieldingly separated from the guide 71. The pan is inclined so that it is substantially parallel with the inclined forward stretches of the sprocket chains as shown by Fig. 7.

Referring to Figs. 7 and 8, it will be seen that a wiper 33 encountering the lower edge of the pan 69 moves upwardly along the pan carrying water collected from the floor, the wiper bearing yieldingly against the pan. When the wiper rises above the rocking bar 74, its pressure against the pan swings or tilts the latter against the guide 71, as shown by Fig. 8, so that the water propelled along the pan by the wiper is also propelled along the guide until it passes over the curved upper edge of the guide and falls into the collecting tank 70. The tilting of the pan at the same time raises its lower edge from the floor so that it passes freely over without displacing a patch of water on the floor until the wiper leaves the upper edge of the pan, when the spring 78 restores the lower edge of the pan to contact with the floor. When the wiper leaves the guide 71 the springs 41 restore it to its normal position against the stop rod 42, where it remains until it again encounters the floor. The pan is provided with guard strips 83 (Fig. 10), which form dams or curbs to prevent the water propelled by the wipers from flowing outwardly from the ends of the wipers. Said guard strips may be movably supported by links 84 pivoted to the strips and to the pan, and pressed yieldingly inward against the ends of the wipers by springs 85 connected with the pan and with two of said links, as shown by Fig. 10, the springs holding the links with which they are connected against stops 86, and the lower ends of the inner edges of the strips being curved to permit the easy entrance of the wipers between the strips. It will now be seen that when the machine is pushed along the floor in the direction of the arrow $x$ (Fig. 7), water delivered by the distributer 45$^a$ is supplied to the brushes which scrub the floor. The pan 69, intermittently raised from the floor as described, coöperates with the wipers 33 and guide 71 in conveying the water to the collecting tank 70, so that all the free water is removed from the floor.

Means are provided for raising the brushes and the wipers carried by the lower stretches of the chains 16 from the floor when the machine is to be transported without operating, the means here shown for raising the brushes being next described. The ends of the brush-carrying bar 49 are loosely connected by links 88 with the frame members 13. Said links are adapted to swing vertically and are located over short lifting arms or cams 89 on a rockshaft 90 which is journaled in bearings in fixed ears or brackets 91. The rockshaft 90 has another arm 92 which is connected by a rod 93 with one arm of a bell crank lever 94 pivoted at 95 to the rear end portion of one of the frame members 13. The other arm of the bell crank lever 94 is connected by a rod 96 with one arm 97 of a bell crank lever which is pivoted at 98, the other arm 99 of said lever being formed as a handle to be manipulated by the operator. A movement of the handle 99 from the full line to the dotted line position (Fig. 1) moves the rockshaft 90 through the described connections from the position shown by Fig. 7 to that shown by Fig. 1, the cam arms 89 being thus caused to swing the links 88 upwardly and raise the brushes. The rockshaft 90 may be provided with additional lifting arms 100 adapted to bear on levers 101, which are pivoted at 102 and are connected with a transverse bar 103 carrying a rubber wiper 104 which is adapted to bear on the floor in advance of the water distributer 45$^a$ and draw water away from the edge of the floor when the machine is moved backwardly. When the rockshaft is turned to the position shown by Fig. 7, the arms 100 raise the rear ends of the levers 101 and depress their forward ends, thus pressing the wiper 104 against the floor. When the rockshaft 90 is turned to Fig. 1 position a spring 106 connected with one of the levers 101 raises the wiper 104 from the floor.

The following means are employed for raising the lower wipers 33 and at the same time the pan 69 from the floor. Two elongated guide bars 105, which are L-shaped in cross section as shown by Fig. 11, are pivoted at their rear ends to arms 106 on a transverse rockshaft 107 and have horizontal portions extending parallel with the floor and upturned forward end portions which are parallel with the ascending forward stretches of the chains 16. The bars 105 are provided with ears or brackets 108 which are pivoted to arms 109 on a transverse rockshaft 110, having additional arms 111 pivoted to the lower portions of the members 76 of the movable pan-carrying frame. The upper portions of said members 76 are connected by links 112 with a rod 113 supported by ears on the frame members 13. The rockshaft 107 has an arm 114 which is connected by a rod 115 with one arm of a bell crank lever 116 pivoted at 117. The other arm of lever 116 is connected by a rod 118 with one arm of a lever 119, which is pivoted at 120. The other arm of said lever bears on a projection 121 on a push bar 122 pivoted at 123 to one frame member 13 and connected by a handle bar 123 with a push bar 124 pivoted to the other frame member 13. When the handle bar and push levers (which are used to propel the machine) are depressed from the full line to the dotted line position shown by Fig. 1, the projection 121 imparts movement through the described connections to the rockshaft 107, and turns the latter in the direction required to raise the arms 106 to the dotted line position (Fig. 1), thus causing said arms to move the guide bars 105 rearwardly and upwardly, the arms 109 connected with the forward portions of the guide bars swinging upwardly and rearwardly at the same time, so that all parts of the guide bars are equally raised. The lower flanges of the L-shaped guide bars 105 bear on the end portions of the lower edges of the wiper-carrying arms 35, as shown by Fig. 11, so that the elevation of the guide bars causes the arms 35 and the wipers 33 to swing upwardly, the wipers being thus raised from the floor. At the same time the arms 111 engaged with the side members 76 of the movable pan-carrying frame raise said frame and with it the pan so that the lower edge of the pan clears the floor. In Fig. 1 I have shown by dotted lines the raised position of the arms 106, but have not shown the corresponding positions of the guide bars 105, the lower wipers and the pan 69, because such showing would impair the clearness of the figure. When the handle and push bars are released a spring 130 connected with the meeting ends of the rod 118 and lever 119 restores said rod and lever, and the other members which move therewith, to the full line position of Fig. 1, the lever 119 being held by the spring against a stop 131. The shipper 32 is connected with the lever 119 and is moved thereby, as shown by dotted lines (Fig. 1), to shift the sprocket wheel 27 to its inoperative position when the handle and push bars are depressed, and is restored by the spring 130 to the full line position (Fig. 1), to permit the sprocket wheel 27 to be shifted by the spring 30 to its operative position.

133 represents a boiler supported above the frame of the machine and above a heater or burner 134 of any suitable type. A pipe line 135 connects the boiler with the pipe line 45, so that steam generated in the boiler may pass with the water from the tank 44 to the distributer 45$^a$, the water being thus heated. The boiler may be provided with a testing cock, a glass gage tube 136 and a supply opening closed by a cap 137.

138 represents a sand hopper resting loosely on a ring-shaped bracket 139 and having an outlet pipe 140 adapted to deliver sand between the water distributer 45$^a$ and the brushes 46. The hopper is jarred to facilitate the escape of sand by a rod 141 slidable in guides 142 and having a loop 141$^a$ partly embracing the hopper. One end of said rod is connected with one arm of a lever 143 pivoted at 144 to a fixed bar 145, the other arm of said lever projecting into the path of the spokes of the wheel 12, and held yieldingly in said path by a spring 146. The lever 143 is oscillated by the said spokes and spring and reciprocates the rod 141 sufficiently to jar the hopper. More than one discharge pipe 140 may be employed or the said pipe may be bifurcated to deliver sand at two or more points. Oblique wipers 147 are connected by arms 148 with the brush bar 49, said wipers being adapted to bear on the floor and arranged as indicated by Fig. 12, to deflect water inwardly from opposite ends of the series of brushes and confine the water to an area the width of which is preferably less than the length of the wipers 33.

Fig. 7 shows a cock 149 in the pipe line 45, said cock having an arm 150 whereby it may be opened and closed. To operate said arm I provide a lever 151 pivoted at 152 and connected by a rod 153 with the cock arm. The lever may be locked by a notched segment 153 and a latch 154. The collecting tank 70 may be connected with the supply tank 44 by a pipe line 155 adapted to conduct water from the collecting tank to the supply tank. The rear end of the machine is provided with a caster 156. 157 represents a guard projecting above the front side of the tank 70 to arrest water thrown off by the wipers 33, when they spring to their normal positions after leaving the guide 71. Tensioning sprocket wheels 158 may be engaged with the upper stretches of the chains 16, said wheels being mounted on swinging arms 159 and pressed upwardly by springs 160. The machine would be operative without the supply tank 44, water being otherwise supplied to the brushes. The machine would also be operative for wiping and removing free water from a floor without the brushes. Steam from the boiler 133 may be delivered by the distributer 45$^a$ for the purpose of sterilizing a floor, the supply of water from the tank 44 being shut off by any suitable means, such as a plug or stopper inserted in the end of the pipe line 45 which enters said tank.

Having described my invention, I claim:

1. A scrubbing machine comprising a wheeled frame, scrubbing means at the forward end of the frame, a water collecting tank and means for transferring free water from the floor behind the scrubbing means to said collecting tank, said means including a pair of endless sprocket chains, supports therefor mounted on said frame and arranged to guide portions of the chains in horizontal lower stretches parallel with the floor and in forward stretches inclined relatively to the floor, a series of flexible wipers, means flexibly connecting the wipers with the chains and having provisions for yieldingly pressing said wipers outwardly from the chains and permitting the wipers to yield inwardly, and an inclined pan mounted on the frame and arranged substantially parallel with the inclined forward stretches of the chains, the wipers being yieldingly pressed against the floor and pan while moving in contact therewith.

2. A scrubbing machine comprising a wheeled frame, scrubbing means at the forward end of the frame, a water collecting tank and means for transferring free water from the floor behind the scrubbing means to said collecting tank, said means including a pair of endless sprocket chains, supports therefor mounted on said frame and arranged to guide portions of the chains in horizontal lower stretches parallel with the floor and in forward stretches inclined relatively to the floor, a series of flexible wipers, means flexibly connecting the wipers with the chains and having provisions for yieldingly pressing said wipers outwardly from the chains and permitting the wipers to yield inwardly, an inclined pan mounted on the frame and arranged substantially parallel with the inclined forward stretches of the chains, the wipers being yieldingly pressed against the floor and pan while moving in contact therewith, and a guide interposed between the upper end of the pan and the collecting tank and adapted to direct water from the pan into the tank, the pan being mounted to swing on a horizontal axis and yieldingly held with its lower end against the floor and its upper end separated from the guide, whereby the wipers are caused to move the upper end of the pan against the guide and raise the lower end of the pan from the floor.

3. A scrubbing machine comprising a wheeled frame, a water collecting tank, means for transferring free water from the floor to said tank, said means including a pair of endless sprocket chains, supports therefor mounted on said frame and arranged to guide portions of the chains in horizontal lower stretches parallel with the floor and in forward stretches inclined relatively to the floor, a series of flexible wipers, means flexibly connecting the wipers with the chains and having provisions for yieldingly pressing said wipers outwardly from the chains and permitting the wipers to yield inwardly, an inclined pan mounted on the frame and arranged substantially parallel with the inclined forward stretches of the chains, the wipers being yieldingly pressed against the floor and pan while moving in contact therewith, and means for raising the lower stretches of the chains, the wipers thereon, and the pan, from the floor.

4. A scrubbing machine comprising a wheeled frame, a pair of endless chains, means for supporting and driving said chains, and a series of wipers and supporting means therefor carried by said chains, each wiper-supporting means including a bed attached to and bridging the space between the chains, an arm hinged to the bed, and attached to the wiper, a spring acting on said arm, and a stop against which the arm is normally pressed by the spring, the arm and wiper being adapted to yield backwardly from the stop.

5. A scrubbing machine comprising a wheeled frame, a gang of brushes located at the forward portion of the frame and connected for simultaneous oscillatory movement, and means for oscillating said brushes in unison, said means including a member rotated by one of the traction wheels adapted to positively move the brushes in one direction, and resilient means for moving the brushes in the opposite direction.

6. A scrubbing machine comprising a wheeled frame, a gang of brushes located at the forward portion of the frame, a bar to which the brushes are pivoted, parallel rods connecting the brushes at opposite sides of the bar, a head pivoted to the bar and having an oblique face and arms bearing on one of the brushes, a vertical shaft having tappet arms adapted to engage said inclined face and positively move the head and brushes in one direction, a sprocket wheel on one of the traction wheels, connections between said wheel and the said vertical shaft, the brushes being moved positively in one direction by the rotation of said shaft, and springs adapted to yieldingly move the brushes in the opposite direction.

7. A scrubbing machine comprising a wheeled frame, a pair of endless sprocket chains and supports therefor mounted on the frame, said supports being arranged to guide portions of the chains in horizontal stretches parallel with the floor, transverse arms flexibly connected with the chains and having flexible wipers, L-shaped guide bars having horizontal portions engaging the end portions of the arms on the lower stretches of the chains, oscillatory arms connecting said guide bars with supports on the frame, and means for moving the oscillatory arms at one end of the guide bars to raise said bars and the wiper arms engaged therewith.

8. A scrubbing machine comprising a wheeled frame, a pair of endless sprocket chains and supports therefor mounted on the frame, said supports being arranged to guide portions of the chains in horizontal stretches parallel with the floor, transverse arms flexibly connected with the chains and having flexible wipers, L-shaped guide bars having horizontal portions engaging the end portions of the arms on the lower stretches of the chains, oscillatory arms connecting said guide bars with supports on the frame, and means for moving the oscillatory arms at one end of the guide bars to raise said bars and the wiper arms engaged therewith, said guide bars having inclined portions extending parallel with portions of the chains.

9. A scrubbing machine comprising a wheeled frame, a pair of endless sprocket chains and supports therefor mounted on the frame, said supports being arranged to guide portions of the chains in horizontal stretches parallel with the floor, the supports including a driven shaft having sprocket wheels engaged with said chains, a driving sprocket wheel on one of the traction wheels of the machine, driving connections between said driving wheel and the said driven shaft, said connections including a shiftable member and means coöperating therewith for making said member alternately operative or inoperative, transverse arms flexibly connected with the chains and having flexible wipers, L-shaped guide bars having horizontal portions engaging the end portions of the arms on the lower stretches of the chains, oscillatory arms connecting said guide bars with supports on the frame, push bars pivoted to the frame of the machine and adapted to swing vertically, connections between one of said push bars and the oscillatory arms at one end of the guide bars, whereby the depression of the push bars raises the guide bars and the wiper arms engaged therewith, and a shipper for said shiftable sprocket wheel engaged with said connections and movable by the depression of the push bars to shift said sprocket wheel to its inoperative position.

10. A scrubbing machine comprising a wheeled frame, scrubbing means located at the forward portion of the frame, a supply tank supported by the frame, a pipe line extending from said tank and terminating in a distributer located near the scrubbing means, a boiler supported by the frame, and a pipe line extending from the boiler and communicating with the pipe line from the supply tank.

In testimony whereof I have affixed my signature, in presence of two witnesses.

ROBERT GOODE.

Witnesses:
C. F. BROWN,
P. W. PEZZETI.

Copies of this patent may be obtained for five cents each, by addressing the "Commissioner of Patents, Washington, D. C."